J. R. CARTER.
PROTECTOR FOR MILK BOTTLES.
APPLICATION FILED AUG. 25, 1911.
1,024,879.
Patented Apr. 30, 1912.
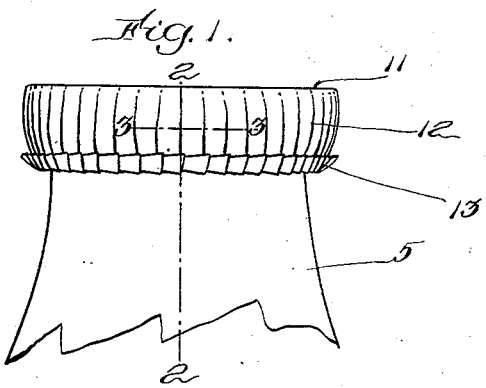
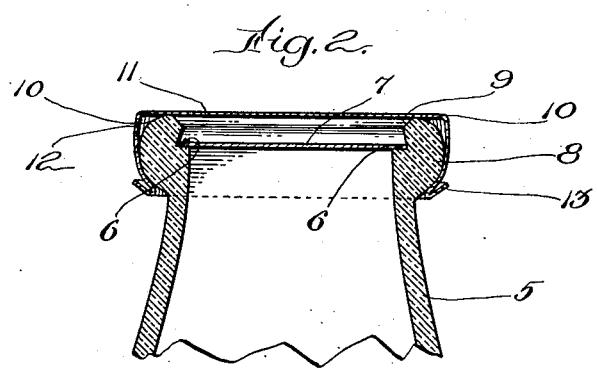
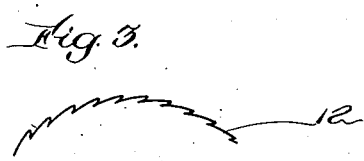
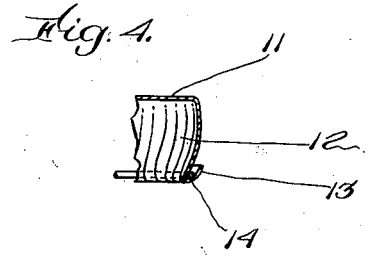
Witnesses:
Harry L. Allen
C. Batchelder
Inventor:
James R. Carter
by Wright, Brown, Quinby & May
Attys.

UNITED STATES PATENT OFFICE.

JAMES R. CARTER, OF WEST NEWTON, MASSACHUSETTS.

PROTECTOR FOR MILK-BOTTLES.

1,024,879.  Specification of Letters Patent.  Patented Apr. 30, 1912.

Application filed August 25, 1911. Serial No. 646,041.

*To all whom it may concern:*

Be it known that I, JAMES R. CARTER, of West Newton, in the county of Middlesex and State of Massachusetts, have invented certain new and useful Improvements in Protectors for Milk-Bottles, of which the following is a specification.

The most common receptacle for milk in use at present comprises a bottle which is closed by a disk stopper which rests upon an internal seat of the neck, somewhat below the top. Such location of the disk stopper is necessary in order that it shall retain its position, but it results in leaving a space which catches dust and dirt and frequently holds a small quantity of spilled milk that sometimes results in stray cats and dogs licking the top of the bottle. This is of course objectionable. When the disk stopper is removed some dirt is liable to fall into the bottle, and frequently some remains adhering to the inner surface of the glass around the top and the milk when poured out must flow over said dirt and is of course liable to carry said dirt with it. The object of my invention is to provide a protector which reliably prevents either access of dirt to the space above the disk stopper and will also prevent any animal from licking the top.

Preferably my improved protector is used in addition to the disk stopper, although it may be used without such stopper, or may be used to cover a partially filled bottle from which the disk stopper has been removed, and a portion of the contents poured out.

To these ends my invention consists in the protector and the combination of it with the milk bottle, substantially as hereinafter described and claimed.

Of the accompanying drawings,—Figure 1 is a side elevation of the upper portion of a milk bottle provided with my improved protector. Fig. 2 is a section on line 2—2 of Fig. 1. Fig. 3 is a diagram to indicate the shape of the crimps preferably imparted to the skirt. Fig. 4 is a detail section illustrating the use of a contractile ring or band carried by the protector.

Similar reference characters indicate the same or similar parts in all of the views.

The upper portion of a milk bottle of ordinary construction is indicated at 5, said bottle having an internal annular shoulder 6, forming a seat for the margin of an ordinary form of disk stopper 7 which is usually of paste board. The outer portion of the top of the bottle is formed with an annular external curved or rounded rib 8. The extreme top of the bottle is formed with an inner bevel 9, which in practice facilitates the placing of the disk stopper 7 in position, the upper portion of the rounded rib 8 presenting an outer bevel 10. Such bottles and disk stoppers are well known.

My invention comprises a paper cap having a flat top 11 and a crimped skirt 12, the margin 13 of which is also crimped and turned outwardly and upwardly, said crimped margin reinforcing the edge of the skirt and increasing its contractile force. In order to insure the proper fitting of the paper cap, and its retention in place, a spring wire ring 14 is fitted within the upturned margin as shown in Fig. 4. In order that the contractile ring 14 may be placed in position if desired, after the cap has been located on the bottle top, the margin 13 of the skirt 12 is turned outwardly, and upwardly, as has been described. If said margin were turned inwardly instead of outwardly, the ring 14 could not be easily placed in position, and if it should slip out after the cap is in place, the cap would have to be removed and the ring re-inserted, in a manner that would require considerable time and effort. Owing to the fact that the margin 13 of the skirt is turned outwardly and upwardly, the said margin presents no obstacle to a close fit over an extended area of the annular bottle rib, as clearly shown in Fig. 2, thereby preventing any possibility of dirt being forced by wind pressure inside of the protector. In practice, the normal diameter inside of the margin 13 when the protector is not on a bottle is such that when the protector is being applied to position, the lower edge of the margin of the skirt will so engage the outer bevel 10 that downward pressure will cause the edge of the skirt to be distended. As the protector is pushed completely down, the contractile edge of the margin will cause the protector to assume a position with its flat top 11 seated on the top of the bottle. In other words, the shape of the skirt is such that, in connection with its contractile tendency, its inner surface is caused to coact with the exterior of the rib 8 of the bottle to hold the protecting cap with its flat top seated on the top of the bottle.

As I have explained, the protecting cap may be employed in addition to the sealing disk stopper commonly employed, such disk stopper usually fitting sufficiently tightly to prevent the loss of any milk, even if the bottle is upset, but so long as a bottle is so carried that no material pressure can be exerted inside the top of the bottle, the disk stopper might be omitted, my improved protector cap taking its place, since its structure is such that the flat top is held automatically snugly down upon the top of the bottle. Of course when the disk stopper 7 is employed and it has been removed and some of the contents of the bottle poured out, it may be thrown away instead of being replaced on its seat, because the cap with the crimped margin will fully take its place so far as any closure is needed when the bottle is preserved, stood upright in a refrigerator or elsewhere. The cap having the crimped skirt can be applied and removed with much greater facility than the disk stopper, and far more thoroughly protects the contents of a bottle than a disk stopper which has once been perforated or otherwise damaged when removing it from its seat to pour some of the milk out.

Preferably the material of which the protector is made is paraffined paper and the paper is of such quality that, when crimped as illustrated and described, the margin of the skirt will possess sufficient elasticity with a tendency to contact to hold the protector in position as described.

I claim:

A protector for milk bottles, comprising a paper cap having a flat top and an elastic skirt to embrace the external rib at the top of the neck of the bottle, the margin of the skirt being turned outwardly and upwardly, said skirt and its turned margin being crimped and having a normal diameter less than that of said annular rib to cause the skirt to hold the flat top seated on the top of the bottle, said outwardly turned margin increasing the contractile force of the skirt and presenting a channel for a spring ring.

In testimony whereof I have affixed my signature, in presence of two witnesses.

JAMES R. CARTER.

Witnesses:
CHAUNCEY L. GILES,
ELIOT A. CARTER.